US 8,276,141 B2

(12) United States Patent
Kaczynski et al.

(10) Patent No.: US 8,276,141 B2
(45) Date of Patent: Sep. 25, 2012

(54) SELECTION OF TRANSACTION MANAGERS BASED ON TRANSACTION METADATA

(75) Inventors: Timothy D. Kaczynski, Poughkeepsie, NY (US); Matthew J. Sykes, Poughkeepsie, NY (US); Edward E. Mezarina, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 12/332,000

(22) Filed: Dec. 10, 2008

(65) Prior Publication Data

US 2010/0146509 A1    Jun. 10, 2010

(51) Int. Cl.
*G06F 9/00* (2006.01)
(52) U.S. Cl. .......................... 718/100; 718/101
(58) Field of Classification Search ............ None
See application file for complete search history.

(56) References Cited

U.S. PATENT DOCUMENTS

| | | | |
|---|---|---|---|
| 5,835,766 A * | 11/1998 | Iba et al. ............... 718/104 |
| 6,178,449 B1 | 1/2001 | Forman et al. |
| 6,233,587 B1 * | 5/2001 | Tandon ................ 1/1 |
| 6,253,257 B1 | 6/2001 | Dundon |
| 6,438,582 B1 | 8/2002 | Hsiao et al. |
| 6,744,878 B1 | 6/2004 | Komissarchik et al. |
| 6,957,113 B1 | 10/2005 | Logsdon et al. |
| 6,990,665 B2 | 1/2006 | Ballantyne |
| 7,009,939 B2 | 3/2006 | Baker et al. |
| 7,203,943 B2 | 4/2007 | Shaffer |
| 7,284,018 B1 | 10/2007 | Waldorf et al. |
| 7,366,738 B2 | 4/2008 | Yorke et al. |
| 7,490,325 B2 | 2/2009 | Jackson |
| 7,590,983 B2 | 9/2009 | Neiman et al. |
| 7,636,741 B2 | 12/2009 | Kulesza et al. |
| 7,685,597 B1 | 3/2010 | Czajkowski et al. |
| 7,730,095 B2 * | 6/2010 | Vishwanath et al. ......... 707/785 |
| 7,996,842 B2 | 8/2011 | Savit |
| 2002/0069235 A1 | 6/2002 | Chen |
| 2002/0152305 A1 | 10/2002 | Jackson et al. |
| 2003/0163469 A1 | 8/2003 | Garth et al. |
| 2004/0216109 A1 | 10/2004 | Bhogi et al. |
| 2005/0021487 A1 * | 1/2005 | Verma et al. .................. 707/1 |
| 2005/0097103 A1 | 5/2005 | Zane et al. |
| 2005/0223382 A1 | 10/2005 | Lippett |
| 2006/0013229 A1 | 1/2006 | Johansson et al. |

(Continued)

OTHER PUBLICATIONS

Office Action for U.S. Appl. No. 12/332,020 dated Jan. 3, 2011.

(Continued)

*Primary Examiner* — Eric Coleman
(74) *Attorney, Agent, or Firm* — Dennis Jung, Esq.; Blanche E. Schiller, Esq.; Heslin Rothenberg Farley & Mesiti P.C.

(57) ABSTRACT

One or more transaction managers are automatically selected from a plurality of transaction managers for use in processing a transaction. The selection is based on types of resources used by the transaction and supported resource types of the transaction managers. The selection of the one or more transaction managers enables less than all of the transaction managers of an application server to be used in transaction commit processing, thereby improving performance.

20 Claims, 7 Drawing Sheets

U.S. PATENT DOCUMENTS

| | | | |
|---|---|---|---|
| 2006/0018304 | A1 | 1/2006 | Nguyen et al. |
| 2006/0085532 | A1 | 4/2006 | Chu et al. |
| 2006/0136887 | A1 | 6/2006 | Kaczynski et al. |
| 2007/0078960 | A1 | 4/2007 | Dawson et al. |
| 2007/0239736 | A1* | 10/2007 | Groff et al. .......... 707/10 |
| 2007/0266045 | A1 | 11/2007 | Bansal et al. |
| 2007/0266148 | A1 | 11/2007 | Ruiz et al. |
| 2008/0148262 | A1 | 6/2008 | Dice |
| 2008/0196029 | A1* | 8/2008 | Doty et al. .......... 718/101 |
| 2010/0146033 | A1 | 6/2010 | Kaczynski et al. |
| 2010/0146509 | A1 | 6/2010 | Kaczynski et al. |

OTHER PUBLICATIONS

"z/Architecture—Principles of Operation," IBM Publication No. SA22-7832-06, Seventh Edition, Feb. 2008.

"Program Directory for WebSphere Application Server for z/OS V6.0.1," Publication No. GI11-2825-04, Mar. 25, 2005.

Final Office Action for U.S. Appl. No. 12/332,020 dated Jun. 22, 2011.

Office Action for U.S. Appl. No. 12/332,020 dated Jan. 24, 2012.

Office Action for U.S. Appl. No. 12/332,020 dated Jul. 17, 2012.

* cited by examiner

SELECTION OF TRANSACTION MANAGERS BASED ON TRANSACTION METADATA

TECHNICAL FIELD

This invention relates, in general, to distributed transactional processing, and in particular, to facilitating selection of transaction managers for use in transactional processing, including use in commit or rollback processing.

BACKGROUND OF THE INVENTION

The cost, in both computation and time, of performing a two-phase commit across distributed transactional resources is high. The transactional manager must coordinate across multiple types of resource managers to deliver a consistent outcome, i.e., commit or rollback. Resource managers can communicate with a transaction manager in different ways. For example, a Java Transaction API/Distributed Transaction (JTA/XA) compliant resource manager receives protocol messages using an XAResource implementation provided by the resource manager, while a Resource Recovery Services (RRS) compliant resource manager receives protocol messages through exits which it has registered with RRS, offered by International Business Machines Corporation. Often a JTA/XA resource manager communicates over TCP/IP, while an RRS compliant resource manager uses cross-memory communication within the same physical system.

A product like the WebSphere® Application Server, offered by International Business Machines Corporation, often has to deal with multiple types of resource managers. Optimization is difficult in this case because each type of resource manager operates differently. In practice, a single transaction will not need to make updates to all types of resource managers, however, today the transaction manager must support such a scenario.

SUMMARY OF THE INVENTION

Having an optimized transaction manager for each resource type or a combination of resource types is desirable, especially when a transaction updates only one type of resource. Such a configuration, however, requires the customer to choose the transaction manager(s) to use for each application and/or transaction. This puts additional administrative burden on the customer, who now must keep track of this information and update it accordingly, if resources are added, removed, or changed from an application.

Based on the foregoing, a need exists for a capability that facilitates the selection of one or more transaction managers for a particular transaction. In particular, a need exists for a capability that selects transaction managers based on metadata, such as the types of resources used by a particular transaction. A further need exists for a capability that facilitates selection of the one or more transaction managers automatically, such as by an application server, without manual intervention by an administrator. A need exists for a selection capability that is able to eliminate one or more transaction managers from commit processing.

The shortcomings of the prior art are overcome and additional advantages are provided through the provision of a method of facilitating selection of transaction managers for use in transactional processing. The method includes, for instance, determining, by a component of a transactional environment, one or more resource types to be used by a transaction executing within the transactional environment, wherein the transactional environment includes a plurality of transaction managers, each transaction manager of the plurality of transaction managers supporting one or more resource types, wherein at least one transaction manager of the plurality of transaction managers supports a resource type not supported by at least one other transaction manager of the plurality of transaction managers; and selecting by the component one or more transaction managers from the plurality of transaction managers to use in completing the transaction, wherein the selecting is based on the determined one or more resource types being used by the transaction.

Systems and program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for facilitating selection of one or more transaction managers to be used in transactional processing, including in commit or rollback processing. The selection of the one or more transaction managers is based on metadata obtained relating to the transaction. This metadata includes, for example, the types of resources used by the transaction. By selecting transaction managers based on resource type, one or more transaction managers may not be needed to complete (e.g., commit or rollback) the transaction, thereby enhancing performance.

In one example, the selection is performed automatically by a component of a transaction processing environment, such as an application server or container of the environment. User or administrator interaction is not needed.

Figure 1:
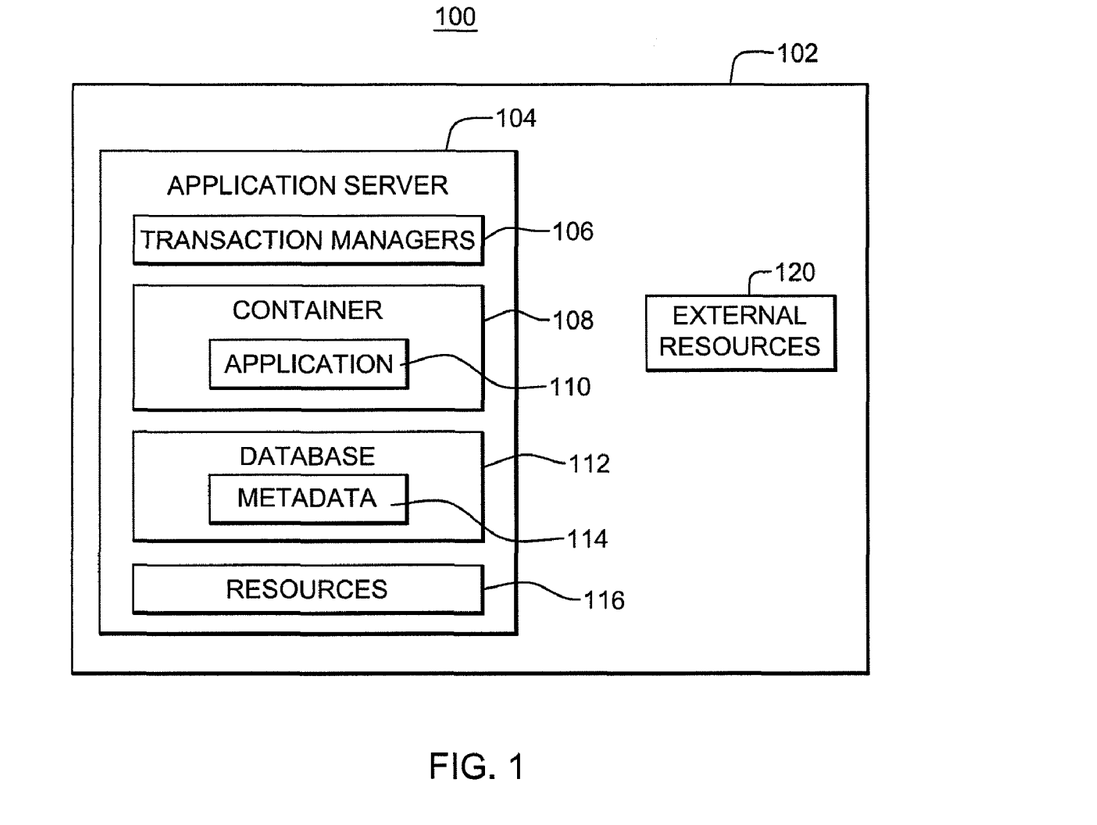
FIG. 1 depicts one example of a transactional processing environment to incorporate and use one or more aspects of the present invention.

One embodiment of a transactional processing environment to incorporate and use one or more aspects of the present invention is described with reference to FIG. 1. In one example, a transactional processing environment 100 is based on the z/Architecture® offered by International Business Machines Corporation. z/Architecture® is described in, for instance, "z/Architecture—Principles of Operation," SA22-7832-06, Seventh Edition, February 2008, which is hereby incorporated herein by reference in its entirety. In particular, the transactional processing environment includes at least one z/Series® processor 102, such as a z10 server executing the z/OS® operating system, as an example. The environment can include one server or be distributed across multiple servers. Further, the servers may be other than z10, z/Series® or based on the z/Architecture®. These are only provided as examples. z/Architecture®, z/Series® and z/OS® are registered trademarks of International Business Machines Corporation, Armonk, N.Y. Other names used herein may be registered trademarks, trademarks or product names of International Business Machines Corporation or other companies.

Executing on the at least one processor 102 is, for instance, one or more application servers 104, such as the WebSphere® Application Server offered by International Business Machines Corporation. WebSphere® is based on J2EE, and as one example is described in Program Directory for WebSphere Application Server for Z/OS V6.0.1, Publication No. GI11-2825-04, Mar. 25, 2005, which is hereby incorporated herein by reference in its entirety. WebSphere® is a registered trademark of International Business Machines Corporation.

In one example, application server 104 includes a plurality of transaction managers 106, a container 108 that executes at least one application 110, and a database or flat file 112 for saving information including metadata 114. Application 110 initiates one or more transactions to be processed by the transactional environment. In particular, in one example, an application includes one or more modules, and each module includes one or more application components. Each application component can initiate one or more transactions, and each transaction may access one or more resources. In one example, the application defines any resources that it wishes to access in the application's deployment descriptor (e.g., metadata for the application). When the application is deployed onto the application server, the resources defined in the application's deployment descriptor are matched to physical resources, which have been defined to the application server.

As indicated above, application server 104 includes or has access to one or more resources 116, and further may access one or more external resources 120, such as other application servers, databases, etc. In accordance with an aspect of the present invention, each resource 116 and each external resource 120 (or subsets thereof) is assigned a resource type. The resource type describes the transactional protocol used by the resource and is exposed for each resource through metadata such that it can be read by any configuration. For example, a JCA resource exposes this information through an extended deployment descriptor in its RAR file. In the event that such metadata is not available, the resource type is assumed to be unknown. The resource type is saved in database 112, in particular, as metadata 114.

Further, in accordance with an aspect of the present invention, for each transaction manager (or a subset thereof), an indication is provided of the preferred resource types for that transaction manager. One embodiment of the logic used to assign resource types to the various transaction managers is described with reference to FIG. 2.

Figure 2:
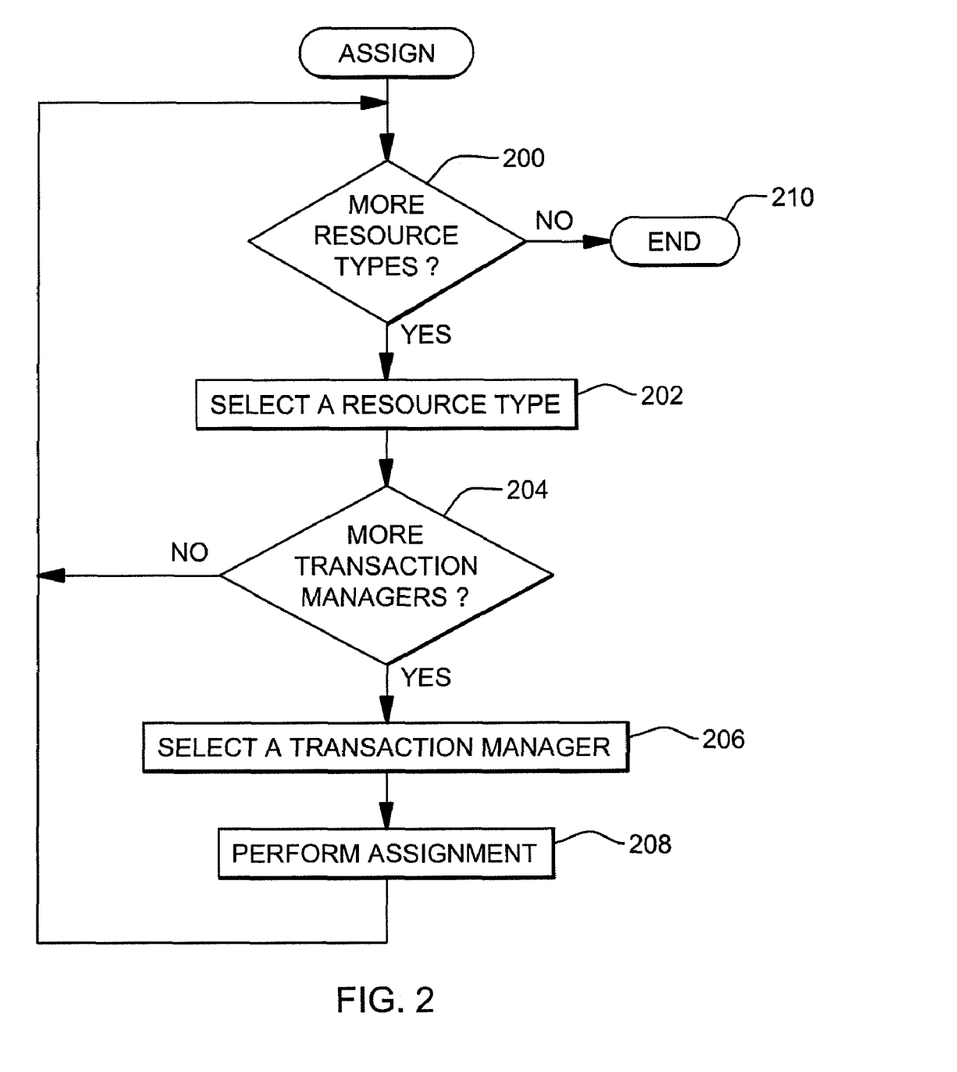
FIG. 2 depicts one embodiment of the logic to assign resource types to transaction managers, in accordance with an aspect of the present invention.

Referring to FIG. 2, initially, a determination is made as to whether there are more resource types to be assigned to one or more transaction managers, INQUIRY 200. Assuming there are more resource types, a resource type is selected, STEP 202. A further determination is made as to whether there are more transaction managers to be checked to determine if this resource type should be assigned to that transaction manager, INQUIRY 204. Assuming there are more transaction managers, a transaction manager is selected, STEP 206. An assignment is then performed of the resource type to the transaction manager, STEP 208. This assignment includes, for instance, providing an indicator that specifies yes, the resource type is to be assigned to the transaction manager; or no, the resource type is not to be assigned to the transaction manager. In a further example, a weighted system is provided, in which each transaction manager (or other entity) assigns a weight based on its performance for a particular resource type or a combination of resource types. Yet further, in one embodiment, if the transaction manager supports some sort of dynamic or deferred enlistment, this is indicated during the assignment. Deferred or dynamic enlistment is defined to mean that the transaction manager does not need to be told the sum total of the resources which are enlisted in the transaction until commit time. Transaction managers using the presume abort protocol typically fall into this category, since they do not persist any information about the transaction until it is in-doubt.

Subsequent to performing the assignment, STEP 208, or when iteration through the transaction managers is complete, INQUIRY 204, processing continues with INQUIRY 200 "More Resource Types?" If there are no further resource types, then assignment processing is complete, STEP 210.

With the assignment of resource types to transaction managers, one or more transaction managers to be used during processing of a particular transaction are selected, in accordance with an aspect of the present invention. One embodiment of the selection process is described with reference to FIG. 3.

Figure 3:
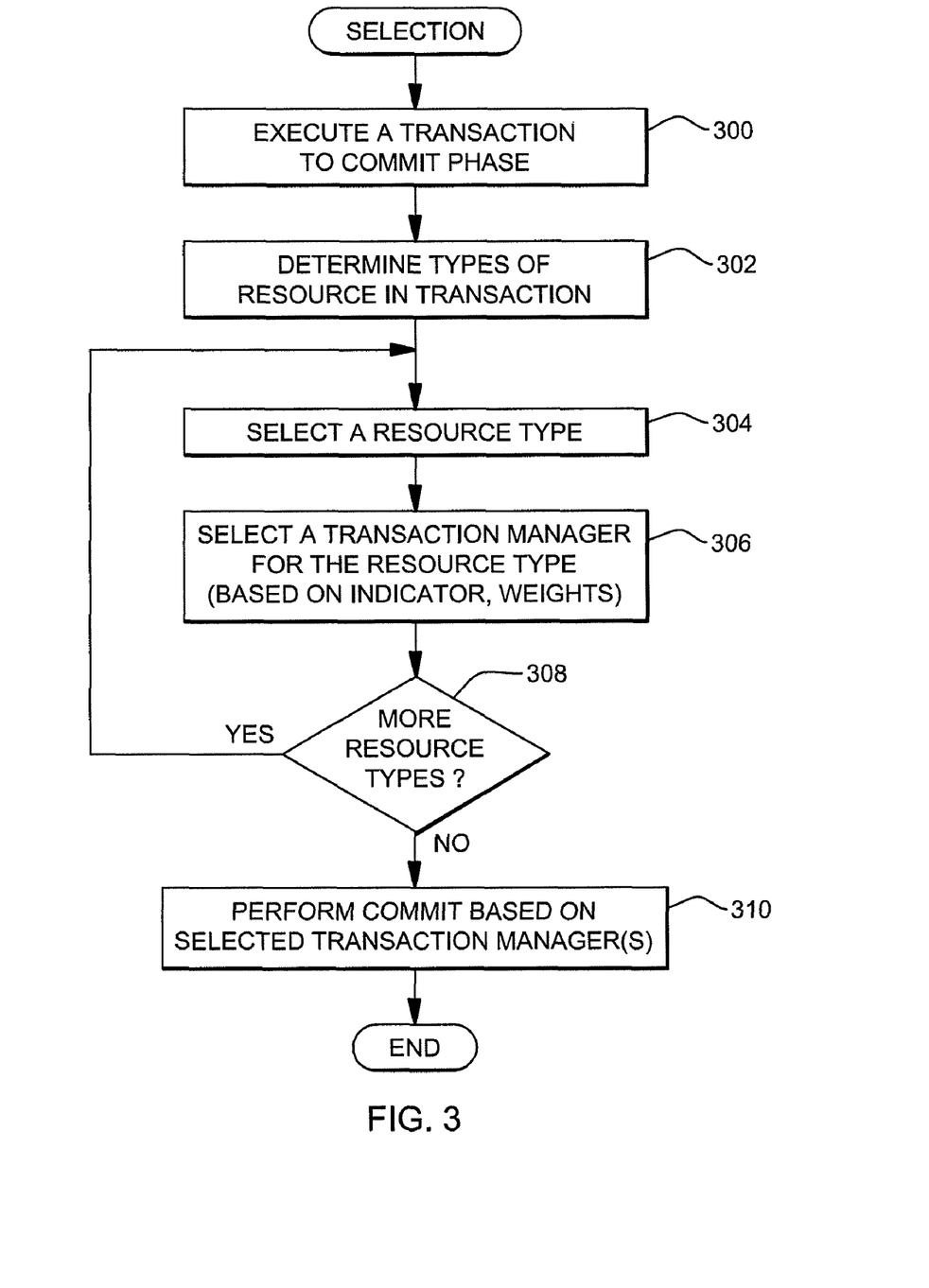
FIG. 3 depicts one embodiment of the logic to select one or more transaction managers to use in processing a particular transaction, in accordance with an aspect of the present invention.

In one example, a transaction is executed to the commit phase, STEP 300. At the commit phase or during another phase of transaction processing, the types of resources in the transaction are determined, STEP 302. A resource type is selected, STEP 304, and a transaction manager is selected for that resource type, STEP 306. Various techniques may be employed to select the transaction manager, as described below.

Thereafter, a determination is made as to whether there are additional resource types, INQUIRY 308. If there are additional resource types, then processing continues with selecting a resource type at STEP 304. However, if there are no more resource types, then processing continues with performing the commit based on the one or more selected transaction managers, STEP 310. The commit is performed, as is known in the art, including performing rollback, if an error occurs.

As previously mentioned, there are various techniques for selecting the appropriate transaction manager for the resource type. Each technique takes into consideration whether the transaction manager can support the particular resource type. A transaction manager may be selected from a list of supporting transaction managers for the particular resource type or an optimized technique may be performed in which a transaction manager is selected based on, for instance, weights. These are further described below.

In one example, when the application server starts, it queries the resources configured in the application server and establishes a transaction manager or set of transaction managers to use. When an application component is driven, the configuration is queried for the types of resources used by that application. One or more appropriate transaction managers are selected and used for an application request (e.g., transaction). Subsequent application requests for different applications may choose one or more different transaction managers, as appropriate.

As a further implementation, when the application server starts, it loads a list of supported transaction managers and their preferred resource types. When an application component is driven, the transaction manager is not established until the first resource enlistment. At first enlistment, an appropriate transaction manager is selected based on the resource type being enlisted. If there are multiple transaction managers available and they support deferred enlistment, the resource enlistment is made at the application server level and not with the transaction manager. Subsequent resources are enlisted in the same way, and transaction managers which do not support the current set of enlisted resources are removed. When the application component is finished, the application server either directs the selected transaction manager to perform the synch point, or will select the optimal transaction manager from the list of remaining transaction managers supporting deferred dynamic enlistment based on the enlisted resources. One example of this implementation is as follows.

In this implementation, RRS, the WebSphere (WAS) JTA transaction manager and a hybrid transaction manager using both RRS and the WAS JTA are provided as three different transaction managers. RRS does not support dynamic enlistment, while the WAS JTA and hybrid transaction managers do. The RRS transaction manager supports only RRS resources (weight=100), the WAS JTA transaction manager supports only JTA resources (weight=100) and the hybrid transaction manager supports both (weight=50 for each). An application component is driven which enlists a JTA resource. The RRS transaction manger is removed from the list of supported transaction managers because it does not support JTA resources. If that same application then enlists an RRS resource, the WAS JTA transaction manager is removed and the remaining hybrid transaction manager becomes the transaction manager for the transaction. If the RRS resource had not been enlisted, at commit time, the application server would choose the WAS JTA transaction manager based on its preferred resource type and weight.

In the various implementations, transaction recovery after a failure involves querying each transaction manager having in-doubt transactions and processing to their resolution.

Different transactional environments may have different types of resources. In one particular example, a transaction initiated by an application of the WebSphere® Application Server may use JDBC Type 2 resources that have a proprietary interface with a particular transaction manager (generalized as Type 2 resources) and/or JDBC Type 4 resources which conform to some specification understood in industry (generalized as Type 4 resources). The selection of transaction managers to be used to complete (i.e., commit or rollback) a transaction depends on which resources are being used by the particular transaction. One example of this processing is described with reference to FIG. 4.

Figure 4:
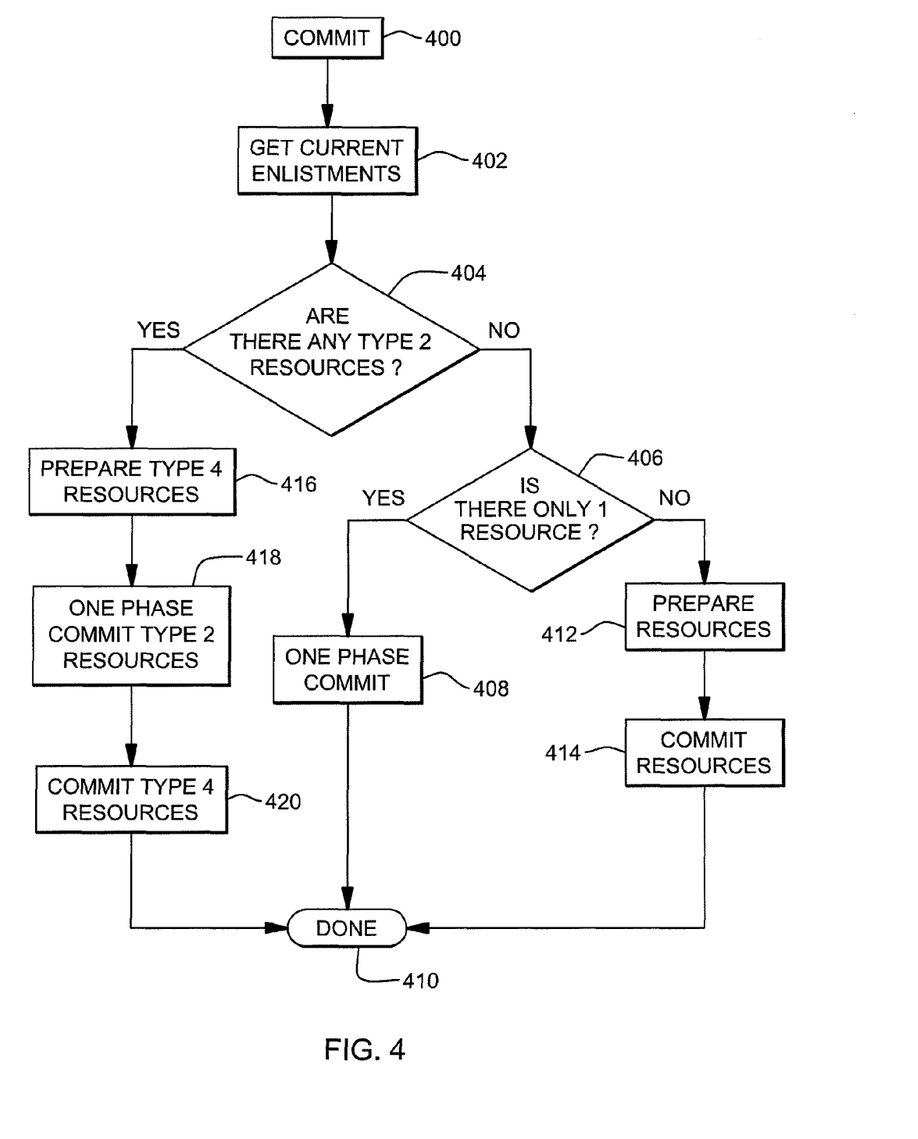
FIG. 4 depicts another example of selection of one or more transaction managers to be used during transactional processing, in accordance with an aspect of the present invention.

In the example of FIG. 4, initially the container calls a managing transaction manager, referred to herein as the federated transaction manager, for commit processing, STEP 400. The federated transaction manager checks the resource enlistments in the transaction for Type 4 and Type 2 resources, STEP 402. If there are no Type 2 resources, INQUIRY 404, the federated transaction manager can eliminate the Type 2 transaction manager and proceed with the commit.

Further, in this example, a determination is made as to whether there is only one resource, INQUIRY 406. If there is only a single resource at this point, the federated transaction manager can remove itself from the path entirely by driving a one-phase commit on the resource, STEP 408. Commit processing is then complete, STEP 410.

If there is more than one resource, INQUIRY 406, then a 2-phase commit is performed using the Type 4 transaction manager. In particular, the resources are prepared for commit, STEP 412, and then the resources are committed, STEP 414.

Returning to INQUIRY 404, if there are both Type 2 and Type 4 resources, then, in one example, initially the Type 4 resources are prepared, STEP 416. Further, a 1-phase commit is performed for the Type 2 resources, STEP 418, and the Type 4 resources are committed, STEP 420.

Although in this example, the test is for Type 2 resources, in another example, the test could be for Type 4 resources, in which the Type 4 transaction manager can be eliminated. Further, similar tests could be made for other types of resources.

Figure 5:
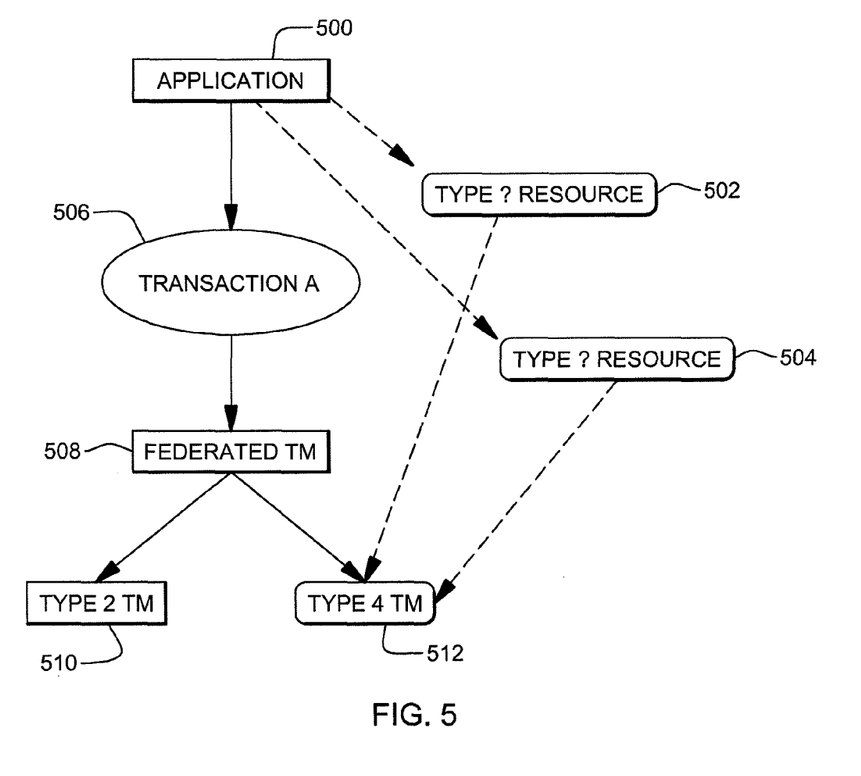
FIG. 5 depicts one example of processing from an application standpoint without use of the present invention.
Figure 6:
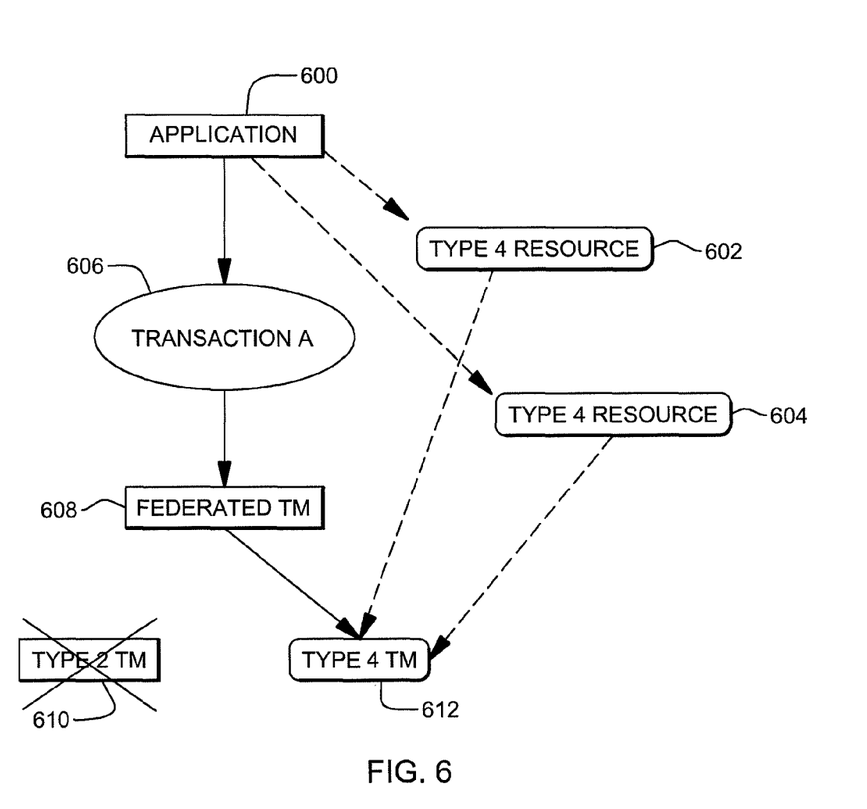
FIG. 6 depicts one example of processing from an application standpoint, in accordance with an aspect of the present invention.

For further understanding of one or more aspects of the present invention, processing from the application's perspective is provided with reference to FIGS. 5 and 6. In particular, FIG. 5 shows details of the commit processing for an un-optimized transaction manager federated across two transaction managers (e.g., Type 2 and Type 4), and FIG. 6 shows the same processing, but with the optimization technique of one or more aspects of the present invention.

Referring initially to FIG. 5, processing is from the perspective of application 500. There are two resources 502, 504 enlisted in a transaction 506, but the federated transaction manager 508 does not know what type they are because they are not tagged. When application 500 commits transaction 506, the container calls federated transaction manager 508 for commit. The federated transaction manager must federate the commit across the Type 2 and Type 4 transaction managers 510, 512, in case either of these transaction managers has work to perform. This is necessary even if there is only one type of resource in this transaction.

In contrast, with reference to FIG. 6, the same commit process is shown from the perspective of an application 600, but the resource types are tagged. In this example, both resources are Type 4 resources (602, 604). Thus, when application 600 commits transaction 606, the federated transaction manager 608 can eliminate the Type 2 transaction manager 610 because it understands that there are no Type 2 resources. Thus, the federation transaction manager passes the commit processing onto the Type 4 transaction manager 612. By eliminating the Type 2 transaction manager, performance is enhanced.

Described in detail above is an automatic technique for selecting transaction managers based on resource types. A set of transaction managers and a set of preferred resource types for each transaction manager are obtained (i.e., provided, determined, received, had, etc.). The set of transaction managers is made available to the application server. Each resource deployed in the application server is assigned to a resource type. The application server chooses the most appropriate transaction manager based on the resource deployed in a particular application or on a particular application server. The transaction manager can also be selected at runtime based on the resources enlisted in the transaction if this is supported by the transaction manager.

Allowing the application server to choose the most appropriate transaction manager eliminates the customer's burden of selecting the transaction manager. The customer does not need to be concerned with which transaction managers are available or which transaction manager(s) should be selected.

In addition to the above, one or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer usable medium, in which the computer medium comprises one or more aspects of the present invention. The code in combination with the computer system is capable of performing one or more aspects of the present invention.

One or more aspects of the present invention can be included in an article of manufacture (e.g., one or more computer program products) having, for instance, computer readable media. The media has therein, for instance, computer readable program code means or logic (e.g., instructions, code, commands, etc.) to provide and facilitate the capabilities of the present invention. The article of manufacture can be included as a part of a computer system or sold separately.

Figure 7:
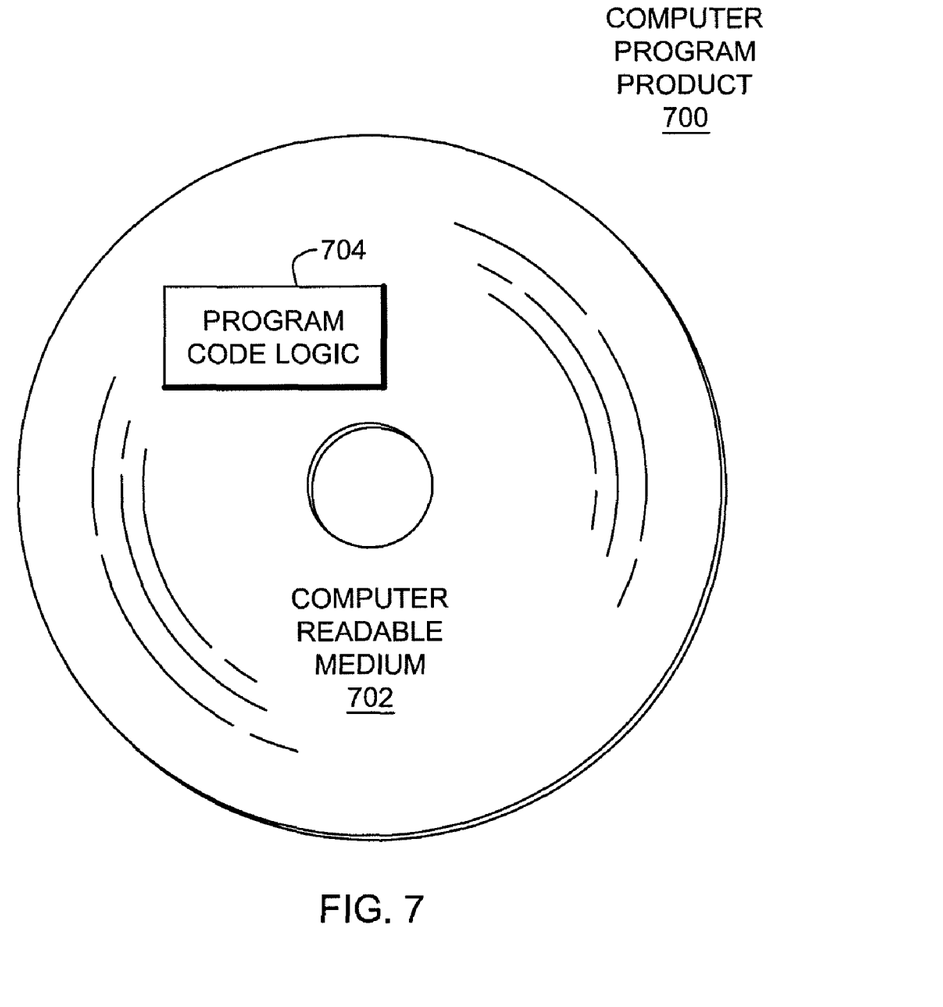
FIG. 7 depicts one embodiment of a computer program product incorporating one or more aspects of the present invention.

One example of an article of manufacture or a computer program product incorporating one or more aspects of the present invention is described with reference to FIG. 7. A computer program product 700 includes, for instance, one or more computer readable media 702 to store computer readable program code means or logic 704 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a dynamic and automatic capability for selecting transaction managers for use in completing transactions is provided. Transaction managers are selected based on metadata (e.g., resource types) of a particular transaction. Such selection enables elimination of those transaction managers not needed for a particular transaction. This reduces the path length of a commit, and possibly allows optimization with a one-phase commit (if only one transaction manager remains and it only has a single enlisted resource).

Additional details relating to the selection of transaction managers may be found in U.S. Ser. No. 12/332,020 entitled "Selection of Transaction Managers Based on Runtime Data," filed herewith, (POU920080222US1), Kaczynski, et al., which is hereby incorporated herein by reference in its entirety.

Although various embodiments are described above, these are only examples. Many variations may be made without departing from the spirit of the present invention. For example, selection may be based on metadata other than resource type. Moreover, there may be the same or different resource types than those described herein. Further, transactional environments other than those based on the z/Architecture® may incorporate and use one or more aspects of the present invention. Additionally, distributed environments with heterogeneous servers may benefit from one or more aspects of the present invention. Many other variations also exist.

Moreover, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating selection of transaction managers for use in transactional processing, said method comprising:
    based on reaching a commit phase of a transaction executing within the transactional environment, determining, by a processor of the transactional environment, one or more resource types to be used by the transaction wherein a resource type describes a transactional protocol used by a resource, wherein the transactional environment includes a plurality of transaction managers, each transaction manager of the plurality of transaction managers supporting one or more resource types, and wherein at least one transaction manager of the plurality of transaction managers supports a resource type not supported by at least one other transaction manager of the plurality of transaction managers; and
    selecting by the processor one or more transaction managers from the plurality of transaction managers to use in completing the transaction, wherein the selecting is based on the determined one or more resource types being used by the transaction.

2. The method of claim 1, further comprising assigning one or more resource types to each of the transaction managers.

3. The method of claim 2, wherein the assigning a resource type to a transaction manager comprises assigning a weight to the resource type for the transaction manager, said weight being based on performance of the transaction manager for that resource type, and wherein the assigned weight is different from a weight assigned to another resource type for the transaction manager.

4. The method of claim 2, wherein the assigning a resource type to a transaction manager comprises providing an indicator to indicate whether the resource type is supported by the transaction manager.

5. The method of claim 1, wherein the processor comprises an application server of the transactional environment.

6. The method of claim 5, wherein the application server comprises two transaction managers, including a Type 2 transaction manager supporting Type 2 resources and a Type 4 transaction manager supporting Type 4 resources.

7. The method of claim 1, wherein the selecting selects one transaction manager, and wherein the method further comprises determining whether there is only one resource to be committed, wherein a one phase commit is performed, in response to the determining indicating there is only one resource to be committed.

8. The method of claim 7, wherein a two phase commit is performed using the one selected transaction manager, in response to the determining indicating there is more than one resource to be committed.

9. The method of claim 1, wherein completing the transaction comprises performing one of a commit or a rollback.

10. The method of claim 1, wherein the selecting a transaction manager of the one or more transaction managers comprises choosing the transaction manager from a list of transaction managers supporting at least one resource type of the one or more resource types.

11. The method of claim 1, wherein selecting a transaction manager of the one or more transaction managers comprises using one or more weights assigned to one or more resource types supported by the transaction manager to make the selection.

12. A system of facilitating selection of transaction managers for use in transactional processing, said system comprising:
    a memory; and
    a processor in communications with the memory, wherein the system is configured to perform a method, said method comprising:
        based on reaching a commit phase of a transaction executing within the transactional environment, determining one or more resource types to be used by the transaction wherein a resource type describes a transactional protocol used by a resource, wherein the transactional environment includes a plurality of transaction managers, each transaction manager of the plurality of transaction managers supporting one or more resource types, and wherein at least one transaction manager of the plurality of transaction managers supports a resource type not supported by at least one other transaction manager of the plurality of transaction managers; and
        selecting one or more transaction managers from the plurality of transaction managers to use in completing the transaction, wherein the selecting is based on the determined one or more resource types being used by the transaction.

13. The system of claim 12, wherein the method further comprises assigning one or more resource types to each of the transaction managers.

14. The system of claim 12, wherein the selecting selects one transaction manager, and wherein the method further comprises determining whether there is only one resource to be committed, wherein a one phase commit is performed, in response to the determining indicating there is only one resource to be committed.

15. The system of claim 12, wherein selecting a transaction manager of the one or more transaction managers comprises choosing the transaction manager from a list of transaction managers supporting at least one resource type of the one or more resource types.

16. The system of claim 12, wherein selecting a transaction manager of the one or more transaction managers comprises using one or more weights assigned to one or more resource types supported by the transaction manager to make the selection.

17. A computer program product to facilitate selection of transaction managers for use in transactional processing, the computer program product comprising:

a non-transitory storage medium readable by a processor and storing instructions for execution by the processor to perform a method comprising:

based on reaching a commit phase of a transaction executing within the transactional environment, determining, by a processor of the transactional environment, one or more resource types to be used by the transaction, wherein a resource type describes a transactional protocol used by a resource, wherein the transactional environment includes a plurality of transaction managers, each transaction manager of the plurality of transaction managers supporting one or more resource types, and wherein at least one transaction manager of the plurality of transaction managers supports a resource type not supported by at least one other transaction manager of the plurality of transaction managers; and selecting by the processor one or more transaction managers from the plurality of transaction managers to use in completing the transaction, wherein the selecting is based on the determined one or more resource types being used by the transaction.

18. The computer program product of claim 17, wherein selecting a transaction manager of the one or more transaction managers comprises choosing the transaction manager from a list of transaction managers supporting at least one resource type of the one or more resource types.

19. The computer program product of claim 17, wherein selecting a transaction manager of the one or more transaction managers comprises using one or more weights assigned to one or more resource types supported by the transaction manager to make the selection.

20. The method of claim 1, wherein the at least one transaction manager comprises a first transaction manager, and wherein a second transaction manager of the plurality of transaction managers supports the resource type supported by the first transaction manager.

* * * * *